US010909689B2

(12) United States Patent
Maltese (10) Patent No.: US 10,909,689 B2
(45) Date of Patent: Feb. 2, 2021

(54) TARGET DETECTION AND TRACKING METHOD

(71) Applicant: SAFRAN ELECTRONICS & DEFENSE, Paris (FR)

(72) Inventor: Dominique Maltese, Paris (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 0 days.

(21) Appl. No.: 16/765,703

(22) PCT Filed: Nov. 23, 2018

(86) PCT No.: PCT/EP2018/082353
§ 371 (c)(1),
(2) Date: May 20, 2020

(87) PCT Pub. No.: WO2019/105858
PCT Pub. Date: Jun. 6, 2019

(65) Prior Publication Data
US 2020/0302614 A1    Sep. 24, 2020

(30) Foreign Application Priority Data

Nov. 29, 2017 (FR) .................................... 17 61364

(51) Int. Cl.
*G06T 7/20* (2017.01)
*G08B 29/18* (2006.01)

(52) U.S. Cl.
CPC .............. *G06T 7/20* (2013.01); *G08B 29/185* (2013.01)

(58) Field of Classification Search
None
See application file for complete search history.

(56) References Cited

U.S. PATENT DOCUMENTS 10,078,903 B2*  9/2018  Maltese ................. G06T 7/277
10,404,931 B2*  9/2019  Maltese ............... H04N 5/3675
(Continued)

OTHER PUBLICATIONS

Sanchez-Matilla et al.; "Online Multi-target Tracing with Strong and Weak Detections;" Medical Image Computing and Computer Assisted Intervention—MICCAI 2015; 18th International Conference in Munich, Germany; 2015; pp. 84-99.
(Continued)

*Primary Examiner* — Tahmina N Ansari
(74) *Attorney, Agent, or Firm* — Oliff PLC; R. Brian Drozd (57) ABSTRACT

A method is provided for detecting and tracking targets in a series of images, at least one track as the existing track, being formed from spots detected in images in the series preceding a current image. The method includes, for the current image: obtaining at least one spot included in the current image and, for each spot, a value representing a characteristic of the spot; classifying each spot according to the representative value in a first category when the representative value is higher than a first predefined threshold or in a second category when the representative value lies between the first predefined threshold and a lower second predefined threshold; for each existing track, allocating a spot in the first category to the existing track and allocating a spot in the second category to the existing track when no spot in the first category is compatible with said existing track.

10 Claims, 5 Drawing Sheets

(56) References Cited

U.S. PATENT DOCUMENTS

| | | | | |
|---|---|---|---|---|
| 2007/0127774 | A1* | 6/2007 | Zhang | G08B 13/19602 |
| | | | | 382/103 |
| 2008/0181453 | A1* | 7/2008 | Xu | G06T 7/277 |
| | | | | 382/103 |
| 2013/0070239 | A1* | 3/2013 | Crawford | G01S 17/66 |
| | | | | 356/139.04 |
| 2016/0171311 | A1* | 6/2016 | Case | G06K 9/00771 |
| | | | | 382/103 |
| 2016/0350938 | A1* | 12/2016 | Maltese | G06T 7/277 |
| 2019/0113624 | A1* | 4/2019 | Robinson | G01S 17/66 |
| 2020/0302614 | A1* | 9/2020 | Maltese | G08B 29/185 |

OTHER PUBLICATIONS

Chen et al., "Enhancing Detection Model for Multiple Hypothesis Tracking," IEEE Conference on Computer Vision and Pattern Recognition Workshops; 2017; pp. 2143-2152.

Jan. 4, 2019 International Search Report issued in International Patent Application No. PCT/EP2018/082353.

Jan. 4, 2019 Written Opinion issued in International Patent Application No. PCT/EP2018/082353.

\* cited by examiner

TARGET DETECTION AND TRACKING METHOD

The invention relates to a method for detecting and tracking targets, as well as a device and an item of equipment adapted for implementing said method.

Methods using target detection and tracking are normally used for carrying out environmental monitoring, in particular in the air and maritime fields. These methods consist of successively capturing a series of optronic images of the environment, seeking, in each of the images, indications of a presence of a potential target, and then, when the indications have been found, confirming or denying the actual presence of a target by determining whether a repetition of consistent detections exists in a plurality of successive images.

The following terms are used in target detection and monitoring:

Spot or hotspot: subpart of an image comprising adjacent pixels having characteristics that are homogeneous with each other and different from the pixels of a near vicinity of the subpart in the image. A spot is detected by applying a detection criterion. This detection criterion can be established according to a mean signal level and/or a noise level in the image. For example, a pixel may be considered to belong to a spot when the luminance level thereof has a difference from a mean luminance level of the pixels in the near vicinity thereof in the image that is higher than a predefined detection threshold. More generally, the detection of a spot may be based on an observation of signal to noise ratio (SNR) values of the pixels of the image. A pixel the SNR of which is higher than a predefined detection threshold is considered to belong to a spot. A spot may correspond to a target or to a detection aberration in an image.

Track: spatiotemporal chain of spots detected in a plurality of successive images. A track may have three states: candidate track (in the course of initialisation or bifurcated), confirmed track or abandoned track. The states of a track are updated using a track management function. The track management function allocates the candidate track state to each new track. A candidate track is normally initialised from spots that have not been used for updating an existing confirmed track. The track management function may confirm a candidate track using more or less sophisticated techniques according to a required performance level or false alarm level. For example, a track may be confirmed when a spatiotemporal chain of spots can be constructed from spots found in Q images in a series of P successive images (P>Q). The track management function allocates the abandoned state to a track when characteristics of said track no longer fulfil a predefined criterion, such as for example when the track has not been updated with a new spot during a number of consecutive images greater than a predefined threshold.

Algorithm for allocating spots to tracks: an algorithm for allocating spots to tracks makes it possible to associate a spot with an existing track (confirmed or in the course of initialisation). When a new image (referred to as a "current image") is obtained by a target detection and tracking method, it is analysed in order to seek spots therein. In parallel, a prediction of a position of a spot, referred to as "predicted spot", is performed from each existing track in order to determine where a spot making it possible to pursue said track may be situated. This prediction of the position of the predicted spot is generally done using a track maintenance function. One or two validation windows are then defined around the position of the predicted spot. A prediction window and an evolution window are then spoken of. A spot suitable for pursuing said track is then sought in these validation windows. The allocation may comprise two steps: precorrelation and definitive allocation. During the precorrelation, the candidate spots for the association of each track are indicated. It is a case of taking into account all the spots that fall within the track validation window. In this way a table is formed indicating whether a spot forms part of the candidates that may be associated with a track. At the time of definitive allocation, a finer analysis is carried out of the relationships between the spots and the tracks. There exist various definitive allocation methods. Mention can thus be made for example of the global nearest neighbour approach (GNN) method or the suboptimal nearest neighbour (SNN) method, both described in the article "*A Study of a Target Tracking Algorithm Using Global Nearest Neighbor Approach*, P. Konstantinova, International Conference on Computer Systems and Technologies (CompSysTech 2003)".

Track maintenance function: a track maintenance function provides an estimation at a current instant and a prediction at an instant following the current instant of kinematic properties of a target tracked from a track. This function is generally implemented by a Kalman function.

The target detection and monitoring methods must find a compromise between effectively detecting spots and avoiding increasing a probability of false alarm (i.e. creating tracks for sets of pixels that do not correspond to targets). It is known that, the more the number of spots detected increases, the more the probability of false alarm increases. So that the number of spots remains reasonable, in general the detection threshold is increased.

On the other hand, it is known that a target may change in a variable environment.

Figure 1A:
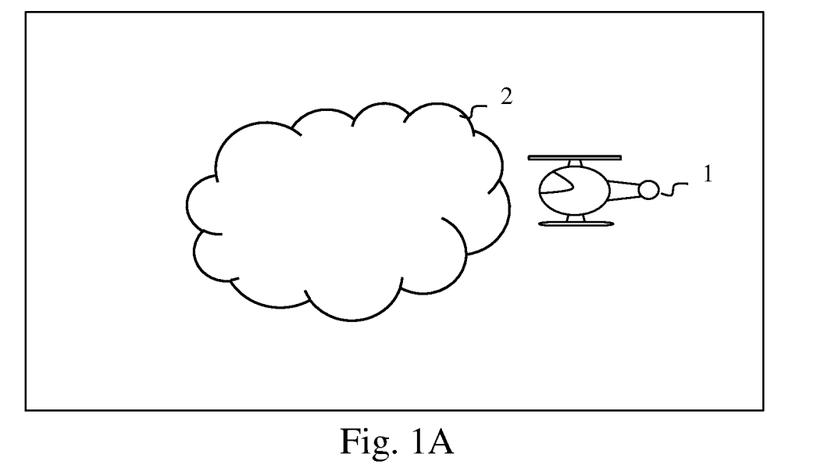
FIGS. 1A, 1B and 1C illustrate schematically images acquired by an optronic device such as a camera (not shown) wherein an aircraft moves in an environment comprising a cloud.
Figure 1B:
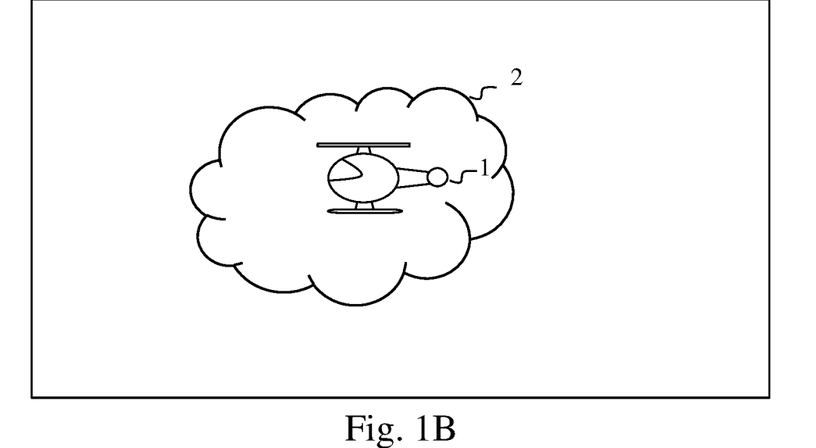
Figure 1C:
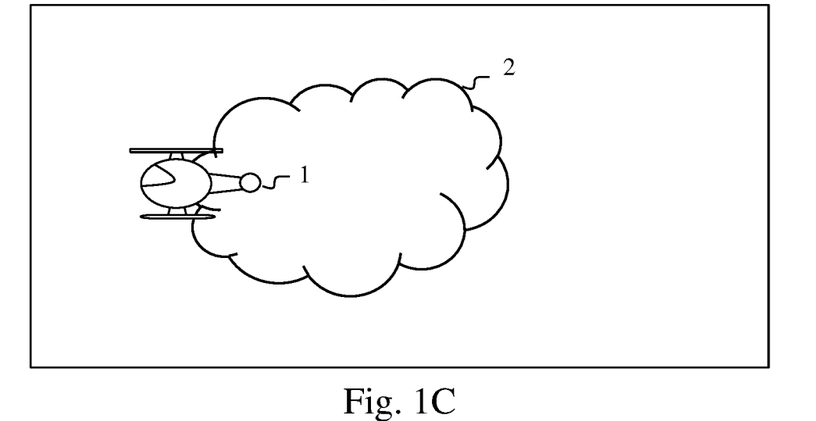

FIGS. 1A, 1B and 1C depict an image acquired by an optronic device such as a camera (not shown) in which an aircraft 1 moves in an environment comprising a cloud 2. As it moves in this environment, the aircraft 1 passes successively from a cloudless zone to a zone with a cloud, and then returns to a cloudless zone. The aircraft 1 is potentially a target able to be detected and tracked by a target detection and tracking method.

In the image shown by FIG. 1A, the pixels corresponding to the aircraft 1 have characteristics (luminance values, SNR values, etc.) that are very different from the pixels in the vicinity of the aircraft 1. A spot corresponding to the aircraft 1 in this image is then detected without difficulty. This is because, for example, the pixels corresponding to the aircraft 1 have SNR values higher than a predetermined detection threshold, which is not the case with the pixels situated in the vicinity of the aircraft 1. This spot can then be allocated to an existing track that would have been created from images preceding the image in FIG. 1A.

In the image depicted by FIG. 1B, the pixels corresponding to the aircraft 1 are embedded in pixels corresponding to the cloud 2. It is then difficult to distinguish the pixels corresponding to the aircraft 1 from the pixels corresponding to the cloud 2 since these pixels have similar characteristics. The cloud 2 corresponds to a textured zone. A textured zone greatly increases the variation in the values of the pixels in the vicinity of a target. The textured zone causes an increase in the noise and therefore a fall in the SNR values. For example, the pixels corresponding to the aircraft 1 have low SNR values, below the predefined detection threshold, like the pixels situated in the vicinity of the aircraft 1. The probability of not detecting a spot corresponding to the aircraft 1 is therefore high. There is a risk that the track corresponding to the monitoring of the aircraft 1 may be abandoned.

In the image shown by FIG. 1C, the aircraft 1 returns to a zone in which the pixels that correspond to it have very different characteristics from the pixels in the vicinity thereof. Once again, the pixels corresponding to the aircraft 1 have SNR values higher than the predetermined detection threshold. It therefore once again becomes easy to detect a spot corresponding to the aircraft 1. If the track has been abandoned in the image corresponding to FIG. 1B, there is a risk of discontinuity of tracking, that is to say a new track may be created in a new identifier in the image corresponding to FIG. 1C, whereas the target (i.e. the aircraft 1) is the same.

This example shows that using a high detection threshold makes it possible to avoid increasing the number of spots detected, but on the other hand prevents the detection of spots corresponding to real targets, when the pixels corresponding to these targets are situated in an environment unfavourable to detection.

It is desirable to overcome these drawbacks of the prior art. It is in particular desirable to propose a method that makes it possible to monitor a target in an environment unfavourable to detection.

It is moreover desirable to propose a method that is simple to implement and which has a low computing cost.

According to a first aspect of the present invention, the present invention relates to a method for detecting and tracking targets in a series of images supplied by an optronic system. The method comprises, for a current image: obtaining at least one spot included in said current image and, for each spot, a value representing a characteristic of said spot; classifying each spot according to said representative value in a first category when said representative value is higher than a first predefined threshold or in a second category when said representative value lies between the first predefined threshold and a second predefined threshold lower than the first predefined threshold; for each existing spatiotemporal chain of spots of a first type, referred to as an existing track of the first type, which has been formed from spots detected in images in said series preceding the current image, allocating a spot in the first category to said existing track of the first type when at least one spot in the first category is compatible, in accordance with a predefined criterion, with said existing track of the first type and, when no spot in the first category is compatible with said existing track of the first type, allocating a spot in the second category when at least one spot in the second category is compatible, in accordance with the predefined criterion, with the existing track of the first type, an allocation of an existing track of the first type making it possible to pursue said existing track of the first type in the current image; creating a new track of the first type for each spot in the first category that has not been allocated to an existing track; classifying each spot in the second category that has not been allocated to an existing track of the first type in a third category if a number of pixels making up this spot is higher than a third predefined threshold and in a fourth category otherwise; for each existing spatiotemporal chain of at least one second type, referred to as an existing track of the second type, which has been formed from spots detected in images in said series preceding the current image, allocating a spot in the third category to said existing track of the second type when at least one spot in the third category is compatible, in accordance with the predefined criterion, with said existing track of the second type and transforming said existing track of the second type into an existing track of the first type when the number of spots making up said track exceeds a predefined number of spots; creating a new track of the second type for each spot in the third category that has not been allocated to an existing track of the second type.

According to one embodiment, the value representing a characteristic of said spot is an SNR value representing SNR values of pixels belonging to said spot, the first and second predefined thresholds being of predefined SNR values.

According to one embodiment, a spot is compatible with an existing track of the first or second type when it is included in a subpart of the current image, referred to as a validation window, corresponding to said track, a validation window being defined around a prediction of a position, referred to as a predicted position, in which a spot corresponding to said track in the current image must be situated, said position being obtained from a track maintenance function taking into account kinematic properties of a target tracked using said track.

According to one embodiment, when a plurality of spots in the first category are compatible with an existing track of the first type, the spot in the first category closest to the predicted position in accordance with a predefined proximity criterion is allocated to said track and, when a plurality of spots in the second category are compatible with an existing track of the second type, the spot in the second category closest to the predicted position according to the predefined proximity criterion is selected, only spots in the first or second category being able to be allocated to a track of the first type.

According to one embodiment, when a plurality of spots in the third category are compatible with an existing track of the second type, the spot in the third category closest to the predicted position in accordance with the predefined proximity criterion is allocated to said track, only spots in the third category being able to be allocated to a track of the second type.

According to one embodiment, the tracks of the second type comprise two track subtypes, a track of the second type being of the first subtype as long as it comprises a number of spots of the third category smaller than a predefined number of spots, a track of the second type being of the second subtype when it comprises a number of spots greater than the first predefined number of spots, a track of the second type of the second subtype being transformed into a track of the first type when a sum of SNR values representing spots constituting said track of the second type is higher than a fourth predefined threshold over a predefined number of successive spots, or when a change in the size of the spots of said track of the second type is strictly increasing over a second predefined number of successive spots, or when a change in the SNR of the spots of said track of the second type is strictly increasing over a third predefined number of successive spots.

According to one embodiment, following the allocation of the spots of the first or second categories to the existing track of the first type, and before the creation of a new track of the first type for each spot in the first category that has not been allocated to an existing track, the method further comprises, for each existing track of the second type of the second subtype, allocating a spot in the first category to said track when at least one spot in the first category is compatible, in accordance with a predefined allocation criterion, with said track and, when no spot in the first category is compatible with said track, allocating a spot in the second category when at least one spot in the second category is compatible, in accordance with the predefined allocation in, with said track.

According to a second aspect of the invention, the invention relates to a device comprising means for implementing the method according to the first aspect.

According to a third aspect of the invention, the invention relates to an item of equipment comprising a device according to the second aspect.

According to a fourth aspect of the invention, the invention relates to a computer program, comprising instructions for implementing, by a device, the method according to the first aspect, when said program is executed by a processor of said device.

According to a fifth aspect of the invention, the invention relates to storage means, storing a computer program comprising instructions for implementing, by a device, the method according to the first aspect, when said program is executed by a processor of said device.

The features of the invention mentioned above, as well as others, will emerge more clearly from a reading of the following description of an example embodiment, said description being given in relation to the accompanying drawings, among which.

The invention is described hereinafter in a context of air surveillance using an image acquisition device making acquisitions of images in a visible domain. The invention could just as well apply in different surveillance contexts such as maritime surveillance. Moreover, the invention applies to other types of image (i.e. other spectral domains) such as infrared images, thermal images and radar images.

Figure 2A:
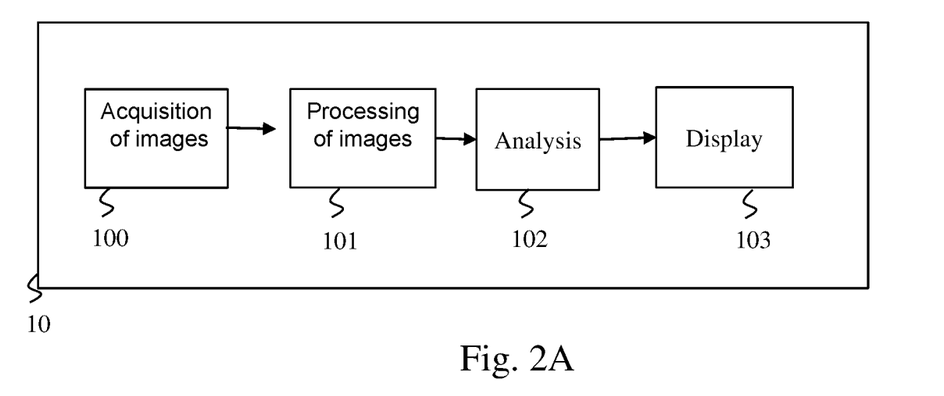
FIG. 2A illustrates schematically an item of equipment able to implement the invention.

FIG. 2A illustrates schematically an item of equipment 10 able to implement the invention.

The equipment 10 comprises an image acquisition module 100 such as a camera operating in the visible spectral domain. The image acquisition module 100 supplies the images that it has acquired to an image processing module 101. The image processing module 101 is able, among other things, to detect spots in each image and to calculate at least one value representing each spot.

The image processing module 101 supplies the acquired images, the position of each spot detected and, for each spot detected, a value representing said spot to an analysis module 102. The analysis module 102 implements a target detection and monitoring method according to the invention. This method, which we describe hereinafter in relation to FIGS. 3, 4, 5 and 6, is capable of creating new tracks, of extending tracks and of abandoning tracks. The analysis module 102 is responsible for confirming tracks and for this purpose uses a track management function.

For each image acquired, the analysis module 102 transmits an item of information representing each track confirmed to a display module 103, which displays this information, so that it can be used by an operator. For example, the analysis module 102 supplies to the display module 103 information representing a position of each spot detected in the last image acquired which was able to be allocated to a confirmed track.

It is considered that the equipment 10 forms an optronic system.

In FIG. 2A, the image-acquisition module 100, image-processing module 101, analysis module 102 and display module 103 are depicted as forming part of the same item of equipment 10. In one embodiment, these modules could also be included in different items of equipment or devices each comprising a communication module enabling them to communicate with each other. These items of equipment or devices then form an optronic system able to implement the invention.

Figure 2B:
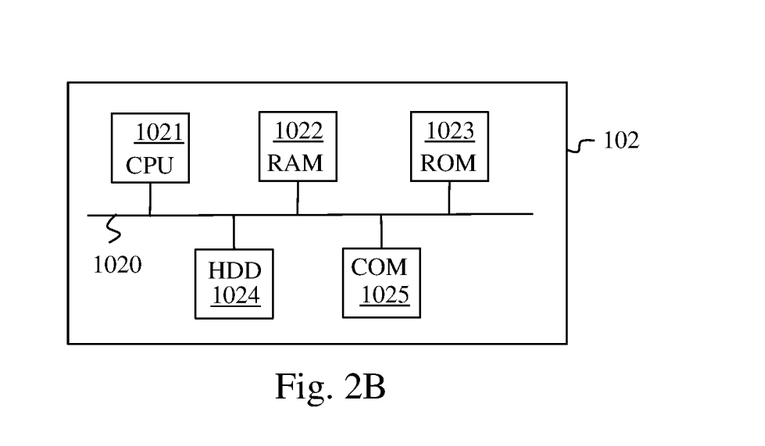
FIG. 2B illustrates schematically a hardware architecture of an analysis module able to implement the invention.

FIG. 2B illustrates schematically an example of a hardware architecture of an analysis module able to implement the invention.

According to the example of hardware architecture depicted in FIG. 2B, the analysis module 102 then comprises, connected by a communication bus 1020: a processor or CPU (central processing unit) 1021; a random access memory RAM 1022; a read only memory ROM 1023; a storage unit such as a hard disk or a storage medium reader, such as an SD (Secure Digital) card reader 1024; at least one communication interface 1025 enabling the analysis module 102 to communicate with the image-processing module 101 and the display module 103.

The processor 1021 is capable of executing instructions loaded in the RAM 1022 from the ROM 1023, from an external memory (not shown), from a storage medium (such as an SD card), or from a communication network. When the equipment 10 is powered up, the processor 1021 is capable of reading instructions from the RAM 1022 and executing them. These instructions form a computer program causing the complete or partial implementation, by the processor 1021, of the methods described hereinafter in relation to FIGS. 3, 4, 5 and 6.

The methods described in relation to FIGS. 3, 4, 5 and 6 can be implemented in software form by the execution of a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit).

Figure 3:
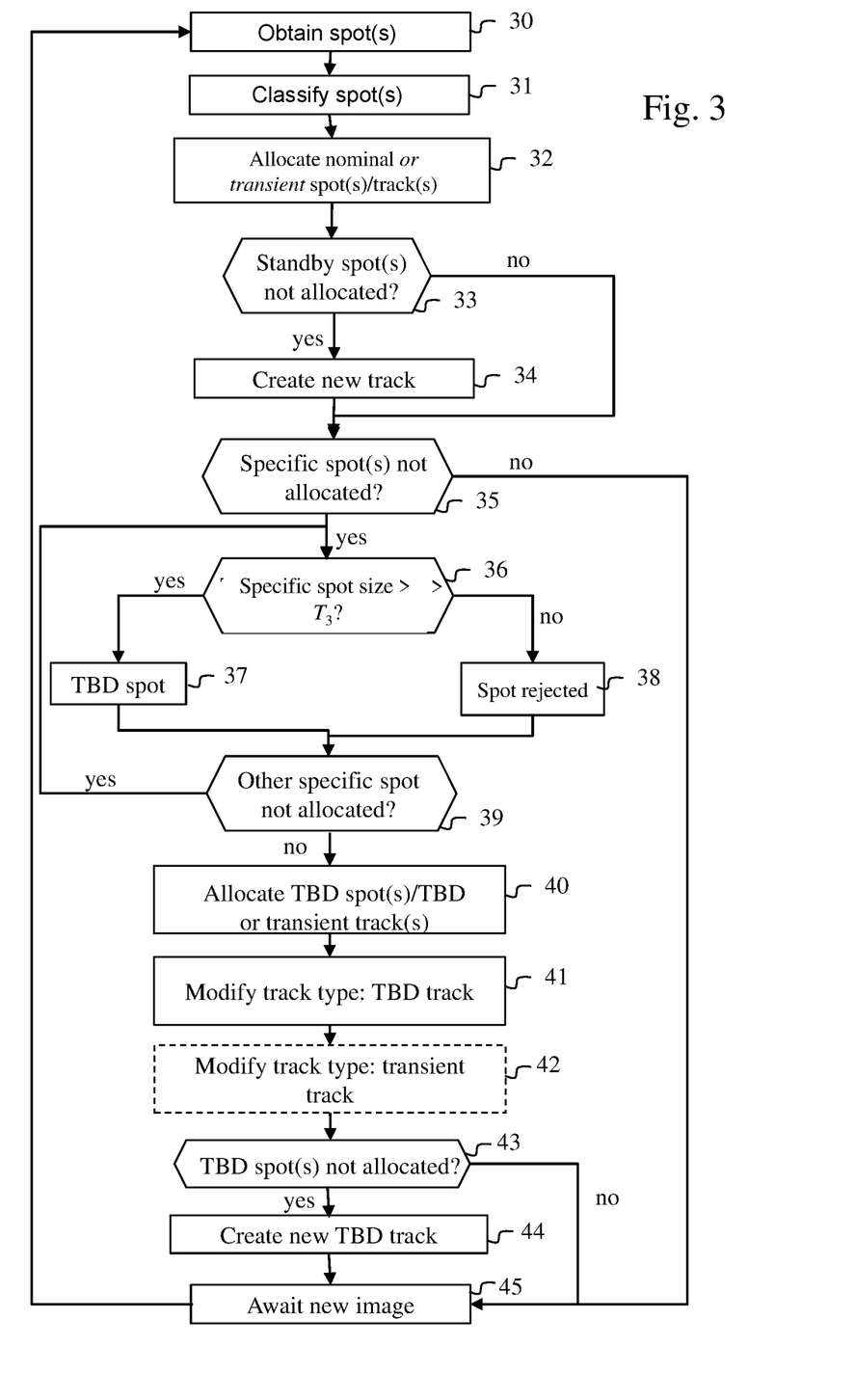
FIG. 3 illustrates schematically a target detection and tracking method according to the invention.

FIG. 3 illustrates schematically a target detection and tracking method according to the invention.

The method is implemented for each image acquired by the image acquisition module 100. An image being processed by the equipment 10 is hereinafter referred to as the current image. In one embodiment, we assume that at least one track, referred to as the existing track, has been formed from spots detected in images preceding the current image.

As we shall see hereinafter, the method uses a plurality of types of track comprising tracks of the nominal type, referred to as nominal tracks, and at least one second type of track comprising tracks of the TBD type, referred to as TBD tracks ("track before detect").

A track is considered to be of the nominal type when it consists of a spot or a set of spots that are of interest in performing target monitoring in accordance with at least one first predefined condition. A first example of a first predefined condition is such that a track comprising at least one spot having an SNR value higher than a predefined SNR threshold is considered to be a nominal track. A second example of a first predefined condition is such that a track comprising a number of spots greater than a predefined number is considered to be a nominal track. Each nominal track may be a confirmed track, a track in the course of initialisation or a bifurcated track created from a confirmed track.

A track is considered to be of the TBD type when it fulfils no first predefined condition. A TBD track must however fulfil at least one second predefined condition, which we describe below.

It should be noted that only the nominal tracks can be confirmed by the analysis module 102. To do this, the analysis module 102 performs a track-management function consisting of confirming a nominal track when said nominal track has been constructed from Q spots found in Q images in a series of P consecutive images (P>Q), P and Q being predefined positive integer numbers. In one embodiment P=20 and Q=16. A track of the second type is never confirmed.

In a step 30, the analysis module 102 obtains at least one spot included in said current image and, for each spot, a value representing a characteristic of said spot VR. In one embodiment, the value representing a spot VR is for example a mean SNR value of the pixels constituting said spot.

In a step 31, the analysis module 102 classifies each spot according to said representative value VR in a first category when said value VR is higher than a first predefined threshold $T_1$ or in a second category when said representative value VR lies between the first predefined threshold $T_1$ and a second predefined threshold $T_2$ lower than the first predefined threshold $T_1$. The first category comprises spots for which the probability of false alarm is low, referred to as standby spots. The second category comprises spots for which the probability of false alarm is higher than for the standby spots. These spots classified in the second category are referred to as specific spots. In the embodiment in which the value representing a spot VR is a mean SNR value, the first and second thresholds $T_1$ and $T_2$ are SNR values obtained on training image sequences. We detail below the classification of the spots in categories in relation to FIG. 4.

In a step 32, the analysis module 102 uses an algorithm for allocation of spots to the existing nominal tracks.

In the context of this algorithm, for each existing nominal track, the analysis module 102 allocates a standby spot to said existing nominal track when at least one standby spot is compatible, according to a predefined allocation criterion, with said existing nominal track. When no standby spot is compatible with said existing nominal track, the analysis module 102 allocates a specific spot when at least one specific spot is compatible, according to the predefined allocation criterion, with the existing nominal track.

In this way the allocations of standby spots are privileged since these are the spots that have the least risk of false alarms (i.e. the least risk of generating false nominal tracks or pursuing nominal tracks whereas the corresponding target is no longer being observed by the image acquisition module 100). However, the specific spots are taken into account for pursuing existing nominal tracks for which no compatible standby spot has been found. Thus nominal tracks are pursued with spots of less good quality in terms of probability of false alarm. Nevertheless, using specific spots for pursuing an existing nominal track makes it possible to pursue nominal tracks that would have been abandoned in error, when, for example, a target is passing through an environment where detection is difficult or when the target is situated at the limit of range of the image acquisition module 100.

It should be noted that, when no existing nominal track has been formed on the previous images, the step 32 of allocation of a track is not performed. The analysis module 102 then passes directly from the step 31 to a step 33.

In the step 33, the analysis module 102 checks whether standby spots have not been allocated to an existing track.

If such is the case, the step 33 is followed by a step 34, during which the analysis module 102 creates a candidate track from the standby spots that have not been allocated to an existing track.

Following the step 34 (or following the step 33 if there no longer remain any standby spots after the use of the spot allocation algorithm), the analysis module 102 performs a step 35 during which the analysis module 102 determines whether at least one specific spot has not been allocated to an existing nominal track.

If each specific spot has been allocated, the analysis module 102 awaits a new image in a step 45 and returns to the step 30 when a new image is supplied to it by the image processing module 101.

If at least one specific spot has not been allocated, the analysis module 102 determines, for each remaining specific spot, whether this specific spot must be definitively rejected, or whether this spot must be preserved in order to create or continue a TBD track. To do this, the analysis module 102 performs the steps 36 to 39 for each specific spot not allocated. During the step 36, the analysis module 102 classifies said specific spot in a third category during a step 37 if a number of pixels making up this specific spot is higher than a threshold $T_3$ and in a fourth category otherwise during a step 38. A spot in the third category is referred to as a TBD spot. The fourth-category spots are definitively rejected by the analysis module 102. In one embodiment $T_3$=6 pixels.

In a step 39, the analysis module 102 determines whether at least one other unallocated specific spot remains to be processed. If so, the analysis module 102 returns to the step 36. Otherwise the analysis module 102 performs a step 40.

During the step 40, the analysis module 102 uses an algorithm for allocation of spots to the existing TDB tracks. In the context of this algorithm, for each existing TBD track, the analysis module 102 allocates a TBD spot to said existing TBD track when at least one TBD spot is compatible, according to the predefined allocation criterion, with said existing TBD track. The step 40 is detailed in relation to FIG. 6.

An example of a second predefined condition that must be complied with by a TBD track is therefore that it consists of TBD spots, that is to say consisting of at least one specific spot not allocated to an existing nominal track, having a representative value VR of less than $T_1$ and greater than $T_2$ and consisting of a number of pixels higher than the threshold $T_3$.

In a step 41, the analysis module 102 determines, for each existing TBD track, whether it can transform said TBD track into a nominal track. In one embodiment, the analysis module 102 transforms the TBD track into a nominal track when the number of spots making up said TBD track exceeds a predefined number NB1. In one embodiment NB1=40.

In a step 43, the analysis module 102 determines whether TBD spots have not been allocated to an existing track. If all the TBD spots have been allocated, the analysis module 102 executes the step 45 already explained. Otherwise, in a step 44, the analysis module 102 creates a new TBD track for each TBD spot that has not been allocated to an existing track. The step 44 is followed by the step 45.

In one embodiment, the tracks of the second type comprise the TBD tracks and so-called transient tracks. It can then be considered that the second type of track comprises two subtypes. The transient tracks are tracks intermediate between the TBD tracks and the nominal tracks. The analysis module 102 transforms a TBD track into a transient track when the number of spots making up said TBD track exceeds a predefined number NB2<NB1. In one embodiment NB2=20. The analysis module 102 transforms a transient track into a nominal track when a condition for transient to nominal transformation is complied with. For example, the analysis module 102 transforms a transient track into a nominal track when a sum of the mean SNRs of spots constituting the transient track is higher than a threshold $T_4$ over a predefined number of successive spots nbp1, or when a change in the size of the spots of the transient track is strictly increasing over a predefined number of successive spots nbp2, or when a change in the SNR of the spots of the transient track is strictly increasing over a predefined number of successive spots nbp3. In one embodiment nbp1=nbp2=nbp3=10 and $T_4$=30 db.

In the embodiment comprising transient tracks, in step 32, the analysis module 102 uses the algorithm for allocation of spots to the existing nominal and transient tracks.

The application of the algorithm for allocating spots to the existing nominal tracks is identical to the embodiment without a transient track described in relation to the step 32. When the existing nominal tracks have been run through, the analysis module 102 applies this algorithm to the existing transient tracks. Thus, for each existing transient track, the analysis module 102 allocates a standby spot to said existing transient track when at least one standby spot is compatible, according to a predefined allocation criterion, with said existing transient track. When no standby spot is compatible with said existing transient track, the analysis module 102 allocates a specific spot when at least one specific spot is compatible, according to the predefined allocation criterion, with the existing transient track.

Thus standby or specific spots can be allocated to the transient tracks.

In the embodiment comprising transient tracks, in step 40, for each existing TBD or transient track, the analysis module 102 allocates a TBD spot to said existing TBD or transient track when at least one TBD spot is compatible, according to the predefined allocation criterion, with said existing TBD or transient track.

In the step 41, the analysis module 102 transforms a TBD track into a transient track when the number of spots making up said TBD track exceeds the predefined number NB2.

In a step 42, the analysis module 102 transforms a transient track into a nominal track when the condition for transformation of transient to nominal is met.

The steps 43, 44 remain identical.

In one embodiment, the value representing a spot VR is a spot size in number of pixels constituting the spot, an entropy of the pixels constituting the spot, or a SURF descriptor ("Speeded Up Robust Features", H. Bay et al., SURF: Speeded Up Robust Features, Computer Vision and Image Understanding (CVIU), Vol. 110, No. 3, pp. 346-359, 2008).

In the case of other types of value representing a spot VR (dimension of the spot, entropy of the pixels constituting the spot, SURF descriptor), the thresholds used $T_1$, $T_2$ and $T_3$ are adapted to the representative values used.

Using a plurality of types of track makes it possible to apply a different processing to each type of track. For example, a nominal track, if it is confirmed, is intended to be displayed on the display module 103. A TBD track is never displayed since, compared with a nominal track, the spots that constitute a TBD track have more chances of being false alarms. However, the more a TBD track persists, the more the probability of this track consisting of spots corresponding to false alarms decreases. This track may for example correspond to an object (for example an aircraft) remaining distant from the image acquisition module 100 as from a certain time, or an object that is difficult for the image processing module 101 to detect since it is well camouflaged. Under these conditions, it is preferable to indicate the presence of this object to an operator looking at the display module 103 and therefore to transform a TBD track into a nominal track.

Figure 4:
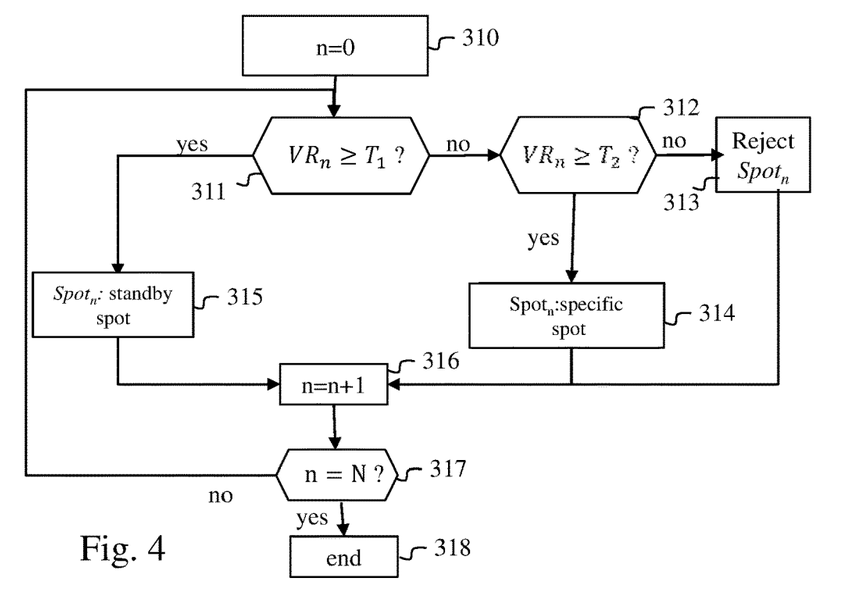
FIG. 4 illustrates schematically a first detail of the target detection and tracking method according to the invention.

FIG. 4 illustrates schematically the step 31 of the target detection and tracking method according to the invention.

In a step 310, the analysis module 102 initialises a variable n to the value 0. The value n serves to count the spots to be processed during the step 31. At each iteration of the method described in relation to FIG. 4, one spot among the spots obtained in the step 30, denoted $Plot_n$, is analysed by the analysis module 102.

In a step 311, the analysis module 102 compares the value representing the spot $Plot_n$, denoted $VR_n$, with the first threshold $T_1$. When $VR_n \geq T_1$, the analysis module 102 classifies the spot $Plot_n$ in the standby spot category in a step 315.

If $VR_n < T_1$, the step 311 is followed by a step 312 during which the analysis module 102 compares the value $VR_n$ with the second threshold $T_2$. When $VR_n \geq T_2$, the analysis module 102 classifies the spot $Plot_n$ in the specific spot category in a step 314.

If $VR_n < T_2$, the step 312 is followed by a step 313 during which the spot $Plot_n$ is rejected by the analysis module 102. The spot $Plot_n$ is then not used for extending a track or for creating a candidate track.

The steps 315 and 314 are followed by a step 316 during which the analysis module 102 increments by one unit the value of the variable n.

In a step 317, the value of the variable n is compared with a variable N representing a number of spots detected by the image processing module 101. If n<N, the method described in relation to FIG. 4 continues by returning to step 311. If n=N, this method ends, which ends step 31.

In one embodiment, when the value representing a spot is a mean SNR of the pixels constituting this spot, $T_1$=12 dB and $T_2$=8 dB.

In one embodiment, when the value representing a spot is a mean SNR of the pixels constituting this spot, the threshold $T_1$ is a predefined SNR value, which can be updated during the analysis of the series of images acquired according to mean SNR values of spots found in the images. The threshold $T_2$ may be a relative value with respect to the threshold $T_1$. For example, $T_2 = T_1 - 4$ dB.

Figure 5:
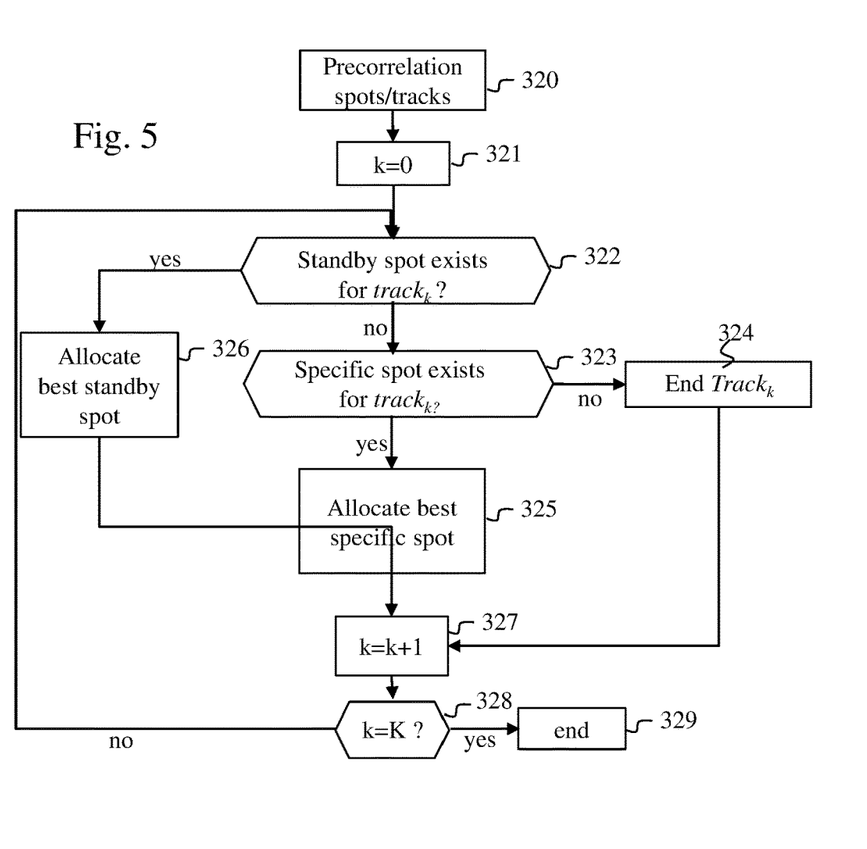
FIG. 5 illustrates schematically a second detail of the target detection and tracking method according to the invention.

FIG. 5 illustrates schematically the step 32 of the target detection and tracking method according to the invention.

In a step 320, the analysis module 102 performs a precorrelation between each spot classified in the step 31 and each existing nominal track. One objective of this precorrelation is to determine, for each existing nominal track, which spot could correspond to this track. In one embodiment, a track maintenance function is applied to each existing nominal track in order to determine where a spot corresponding to said track should be situated. This track maintenance function makes it possible to determine a position of a predicted spot and a validation window around said predicted spot. Each spot appearing in the validation window of an existing nominal track is a candidate for the association with said track.

In a step 321, the analysis module 102 initialises a variable k to 0. The variable makes it possible to enumerate the existing nominal tracks.

In a step 322, the analysis module 102 begins an analysis of the $k^{th}$ existing nominal track, denoted $track_k$. In the step 322, the analysis module 102 determines whether at least one standby spot corresponds to the existing nominal track $track_k$. If this is the case, in one embodiment, the analysis module 102, in a step 326, allocates the standby spot that is closest in accordance with a predefined metric to the position of the predicted spot corresponding to the existing nominal track $track_k$. The predefined metric is for example a Euclidian distance.

Otherwise, if no standby spot corresponds to the existing nominal track $track_k$, in a step 323 the analysis module 102 determines whether at least one specific spot corresponds to the existing nominal track $track_k$. If such is the case, in one embodiment, the analysis module 102, in a step 325, allocates the specific spot that is closest in accordance with the predefined metric to the position of the predicted spot corresponding to the existing nominal track $track_k$.

Otherwise, if no specific spot corresponds to the existing nominal track $track_k$, the analysis module 102 ends the analysis of the track $track_k$ in a step 324.

The steps 326, 323 and 324 are followed by a step 327, during which the analysis module 102 increments by one unit the variable k.

In a step 328, the analysis module 102 compares the value of the variable k with a variable K corresponding to the number of existing nominal tracks. If the variable k equals the variable K, the analysis module 102 ends the step 32. Otherwise the analysis module 102 once again performs the step 322.

In one embodiment, when an existing nominal track is not updated during a predefined number of images, said track is abandoned by the analysis module 102.

Figure 6:
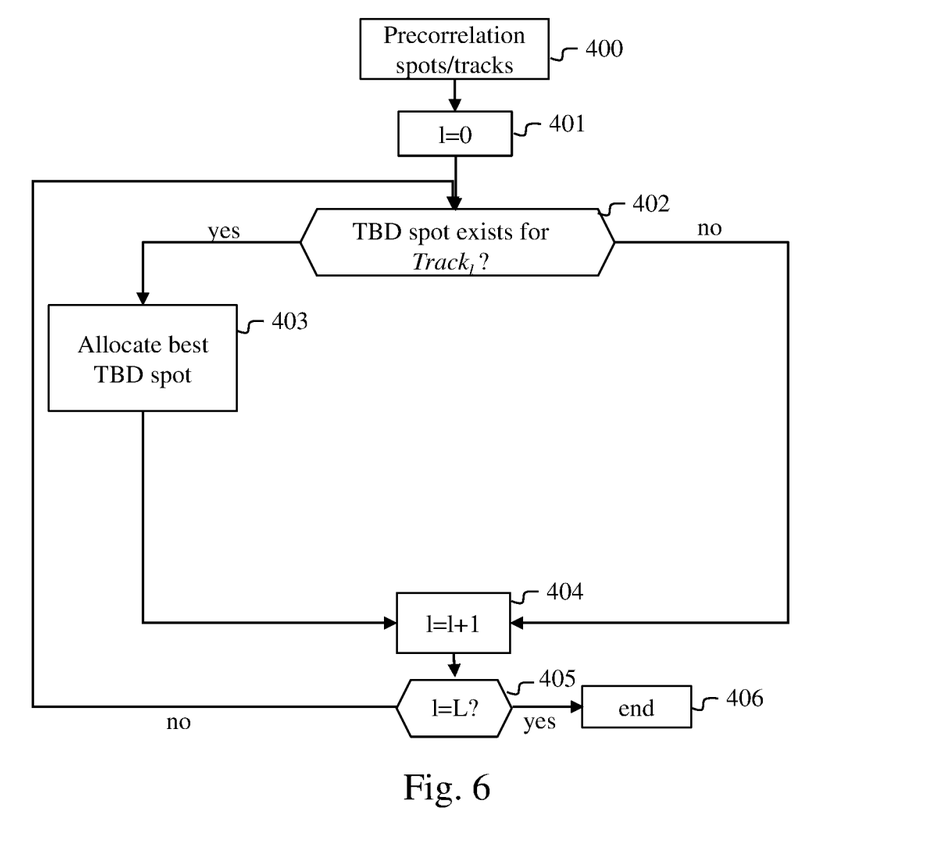
FIG. 6 illustrates schematically a third detail of the target detection and tracking method according to the invention.

FIG. 6 illustrates schematically the step 40 of the target detection and tracking method according to the invention.

In a step 400, the analysis module 102 performs a precorrelation between each TBD classified spot in step 37 and each TBD or transient track. One objective of this precorrelation is to determine, for each existing TBD or transient track, which spot could correspond to this track. In one embodiment, a track maintenance function is applied to each existing TBD or transient track in order to determine where a spot corresponding to said track should be situated. This track maintenance function makes it possible to determine a position of a predicted spot and a validation window around said predicted spot. Each spot appearing in the validation window of an existing TBD or transient track is a candidate for association with said track.

In a step 401, the analysis module 102 initialises a variable l to 0. The variable makes it possible to enumerate the existing TBD or transient tracks.

In a step 402, the analysis module 102 begins an analysis of the $l^{th}$ existing TBD or transient track, denoted $track_l$. In the step 402, the analysis module 102 determines whether at least one TBD spot corresponds to the existing TBD or transient track $track_l$. If such is the case, in one embodiment, the analysis module 102, in a step 403, allocates the TBD spot that is closest, according to the predefined metric, to the position of the predicted spot corresponding to the existing TBD or transient track $track_l$.

The step 403 is followed by a step 404 during which the analysis module 102 increments the variable l by one unit.

If no TBD spot corresponds to the existing TBD or transient track $track_l$, the step 402 is followed directly by the step 404.

In a step 405, the analysis module 102 compares the value of the variable l with a variable L corresponding to the number of existing TBD or transient tracks. If the variable l equals the variable L, the analysis module 102 ends the step 40. Otherwise the analysis module 102 once again performs the step 402.

In one embodiment, when an existing TBD or transient track is not updated during a predefined number of images, said track is abandoned by the analysis module 102.

The invention claimed is:

1. A method for detecting and tracking targets in a series of images supplied by an optronic system, wherein the method comprises, for a current image:
   obtaining at least one spot included in said current image and, for each spot, a value representing a characteristic of said spot;
   classifying each spot according to said representative value in a first category when said representative value is higher than a first predefined threshold in a second category when said representative value lies between the first predefined threshold and a second predefined threshold lower than the first predefined threshold, the spots in the second category having a probability of false alarm higher than the spots in the first category;
   for each existing spatiotemporal chain of spots of a first type, referred to as an existing track of the first type, which has been formed from spots detected in images in said series preceding the current image, allocating a spot in the first category to said existing track of the first type when at least one spot in the first category is compatible, in accordance with a predefined criterion, with said existing track of the first type and, when no spot in the first category is compatible with said existing track of the first type, allocating a spot in the second category when at least one spot in the second category is compatible, in accordance with the predefined criterion, with the existing track of the first type, an allocation of an existing track of the first type making it possible to pursue said existing track of the first type in the current image;
   creating a new track of the first type for each spot in the first category that has not been allocated to an existing track;
   classifying each spot in the second category that has not been allocated to an existing track of the first type in a third category if a number of pixels making up this spot is higher than a third predefined threshold and in a fourth category otherwise;
   for each existing spatiotemporal chain of spots of at least one second type, referred to as an existing track of the second type, which has been formed from spots detected in images in said series preceding the current image, allocating a spot in the third category to said existing track of the second type when at least one spot in the third category is compatible, in accordance with the predefined criterion, with said existing track of the second type and transforming said existing track of the second type into an existing track of the first type when the number of spots making up said track exceeds a predefined number of spots;

creating a new track of the second type for each spot in the third category that has not been allocated to an existing track of the second type.

2. The method according to claim 1, wherein the value representing a characteristic of said spot is an snr value representing snr values of pixels belonging to said spot, the first and second predefined thresholds being of predefined snr values.

3. The method according to claim 1, wherein a spot is compatible with an existing track of the first or second type when it is included in a subpart of the current image, referred to as a validation window, corresponding to said track, a validation window being defined around a prediction of a position, referred to as a predicted position, in which a spot corresponding to said track in the current image must be situated, said position being obtained from a track maintenance function taking into account kinematic properties of a target tracked using said track.

4. The method according to claim 3, wherein, when a plurality of spots in the first category are compatible with an existing track of the first type, the spot in the first category closest to the predicted position in accordance with a predefined proximity criterion is allocated to said track and, when a plurality of spots in the second category are compatible with an existing track of the first type, the spot in the second category closest to the predicted position according to the predefined proximity criterion is selected, only spots in the first or second category being able to be allocated to a track of the first type.

5. The method according to claim 3, wherein, when a plurality of spots in the third category are compatible with an existing track of the second type, the spot in the third category closest to the predicted position in accordance with the predefined proximity criterion is allocated to said track, only spots in the third category being able to be allocated to a track of the second type.

6. The method according to claim 1, wherein the tracks of the second type comprise two track subtypes, a track of the second type being of the first subtype as long as it comprises a number of spots of the third category smaller than a predefined number of spots, a track of the second type being of the second subtype when it comprises a number of spots greater than the first predefined number of spots, a track of the second type of the second subtype being transformed into a track of the first type when a sum of snr values representing spots constituting said track of the second type is higher than a fourth predefined threshold over a predefined number of successive spots, or when a change in the size of the spots of said track of the second type is strictly increasing over a second predefined number of successive spots, or when a change in the snr of the spots of said track of the second type is strictly increasing over a third predefined number of successive spots.

7. The method according to claim 6, wherein, following the allocation of the spots of the first or second categories to the existing track of the first type, and before the creation of a new track of the first type for each spot in the first category that has not been allocated to an existing track, the method further comprises, for each existing track of the second type of the second subtype, allocating a spot in the first category to said track when at least one spot in the first category is compatible, in accordance with a predefined allocation criterion, with said track and, when no spot in the first category is compatible with said track, allocating a spot in the second category when at least one spot in the second category is compatible, in accordance with the predefined allocation, with said track.

8. A device for detecting and tracking targets in a series of images supplied by an optronic system, wherein the device comprises electronic circuitry configured to:

obtain at least one spot included in a current image and, for each spot, a value representing a characteristic of said spot;

classify each spot according to said representative value in a first category when said representative value is higher than a first predefined threshold in a second category when said representative value lies between the first predefined threshold and a second predefined threshold lower than the first predefined threshold, the spots in the second category having a probability of false alarm higher than the spots in the first category;

for each existing spatiotemporal chain of spots of a first type, referred to as an existing track of the first type, which has been formed from spots detected in images in said series preceding the current image, allocate a spot in the first category to said existing track of the first type when at least one spot in the first category is compatible, in accordance with a predefined criterion, with said existing track of the first type and, when no spot in the first category is compatible with said existing track of the first type, allocate a spot in the second category when at least one spot in the second category is compatible, in accordance with the predefined criterion, with the existing track of the first type, an allocation of an existing track of the first type making it possible to pursue said existing track of the first type in the current image;

create a new track of the first type for each spot in the first category that has not been allocated to an existing track;

classify each spot in the second category that has not been allocated to an existing track of the first type in a third category if a number of pixels making up this spot is higher than a third predefined threshold and in a fourth category otherwise;

for each existing spatiotemporal chain of spots of at least one second type, referred to as an existing track of the second type, which has been formed from spots detected in images in said series preceding the current image, allocate a spot in the third category to said existing track of the second type when at least one spot in the third category is compatible, in accordance with the predefined criterion, with said existing track of the second type and transform said existing track of the second type into an existing track of the first type when the number of spots making up said track exceeds a predefined number of spots;

create a new track of the second type for each spot in the third category that has not been allocated to an existing track of the second type.

9. An equipment comprising a device according to claim 8.

10. A non-transitory storage medium storing a computer program comprising instructions for implementing, by a device, the method according to claim 1, when said program is executed by a processor of said device.

* * * * *